Nov. 17, 1942.          L. G. EHMANN          2,302,198
HOOK AND CABLE COUPLING
Filed Aug. 15, 1941          2 Sheets-Sheet 1
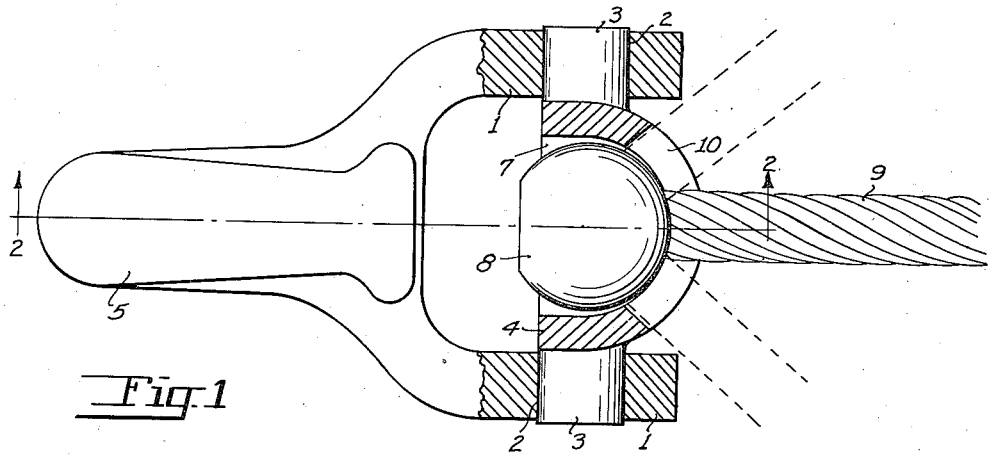
Fig. 1
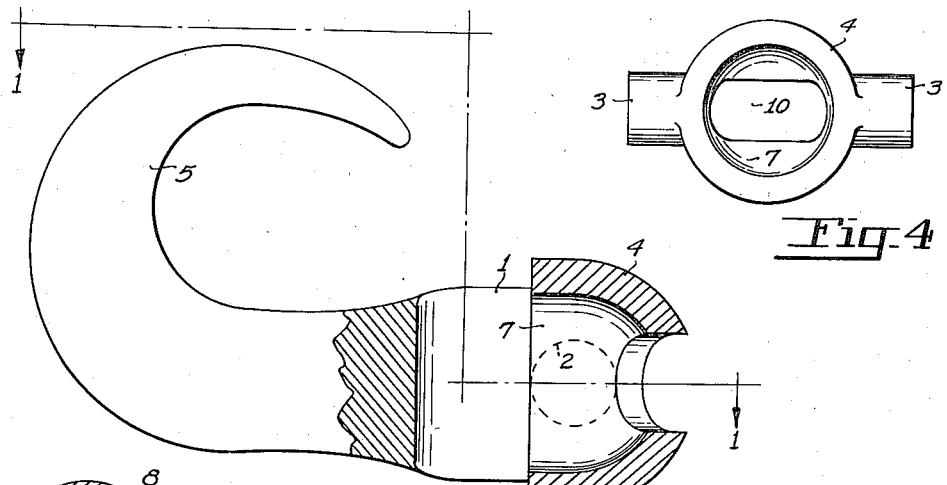
Fig. 2
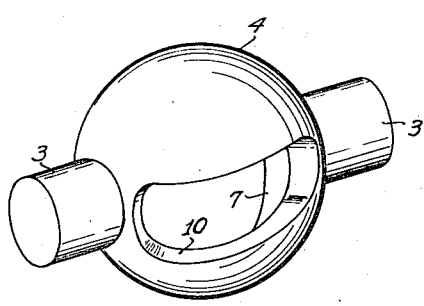
Fig. 3
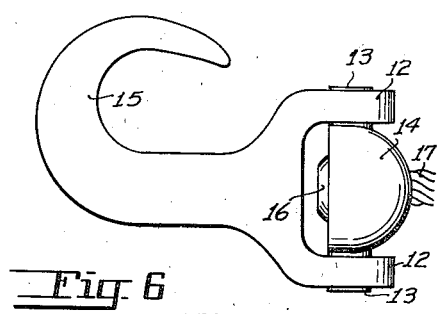
LESLIE G. EHMANN
INVENTOR.
BY
ATTORNEY Nov. 17, 1942.　　　　L. G. EHMANN　　　　2,302,198
HOOK AND CABLE COUPLING
Filed Aug. 15, 1941　　　　2 Sheets-Sheet 2

LESLIE G. EHMANN
INVENTOR.

BY
ATTORNEY

Patented Nov. 17, 1942

2,302,198

UNITED STATES PATENT OFFICE 2,302,198

HOOK AND CABLE COUPLING

Leslie G. Ehmann, Portland, Oreg., assignor to Electric Steel Foundry Company, Portland, Oreg., a corporation of Oregon Application August 15, 1941, Serial No. 407,025

9 Claims. (Cl. 294—82)

This invention relates to swiveled couplings for heavy duty cables, and has particular reference to a new and improved coupling for attaching a hook to a cable for heavy draft operations such as required by the logging industry.

It is an object of the present invention to provide a novel type of hook for use with a draft cable which will permit the hook to seek its own alignment to the line of tension on the cable.

A further object of the invention is to provide a type of hook for use with logging equipment which will eliminate pounding action and wear on the cable at the connection between the choker lines and the draft cable.

A further object of the invention is to provide a novel type of connection between an arch line and the choker lines in logging operations.

A further object of the invention is to provide a novel coupling for attaching a hook to a draft cable.

In certain types of logging operations, the logs are brought out of the woods to the bucking landing or to the loading platform by dragging them along over the ground by means of wire cables. The equipment commonly used for this purpose includes a tractor and an arched frame known as a cruiser. In the woods, the frame is called the "arch" and comprises a mobile crane adapted to be coupled to a tractor for hauling logs. Mounted on the tractor is a drum having wound thereon a cable, and fastened to the free end of the cable is a hook. This cable is called the "main line" or "arch line." When the trees are felled in the woods and are cut into logs, cables are noosed around one end of each log, these cables being known as "choker lines," and in the end of each choker line is an eye splice adapted to be received on the hook fastened to the arch line. When the logs are ready to be hauled in, the tractor towing the cruiser gets as close to the log as possible, usually within a distance of twenty to thirty feet, whereupon the operator takes hold of the hook and pulls it away from the cruiser, reeling the cable off of the drum until the hook has reached its desination and has received the ends of the choker lines. Thereupon, the drum on the tractor is rotated to wind up the arch line until the logs are pulled up to the cruiser, their forward ends being lifted off the ground to facilitate dragging them over the rough terrain.

The drawings which form a part of this specification have been made to scale from an actual embodiment of the invention which fulfills the above stated objects and others apparent from the further disclosure herein. It will be understood that various changes in form, proportion, size and details of construction within the scope of the claims may be resorted to without departing from the spirit or sacrificing any of the advantages of the invention. In the drawings:

Figure 1 is a plan view, partially in section, of a hook and cable coupling embodying the invention, taken in the plane of the bight of the hook as indicated by the line 1—1 in Figure 2, and illustrating the manner in which the end of the draft cable is secured to the hook.

Figure 2 is a side elevation, partially in section, of the hook, taken on the line 2—2 of Figure 1.

Figure 3 is a perspective view of the knuckle for attaching the draft cable to the hook.

Figure 4 is a plan view of the knuckle, looking into the socket for receiving the ferrule on the end of the draft cable.

Figure 5 is a sectional elevation of the ferrule.

Figure 6 is a side elevation of a hook and cable coupling comprising a modification of the invention, the bight of the hook lying in a plane parallel to the axis of the knuckle trunnions.

Figure 7:
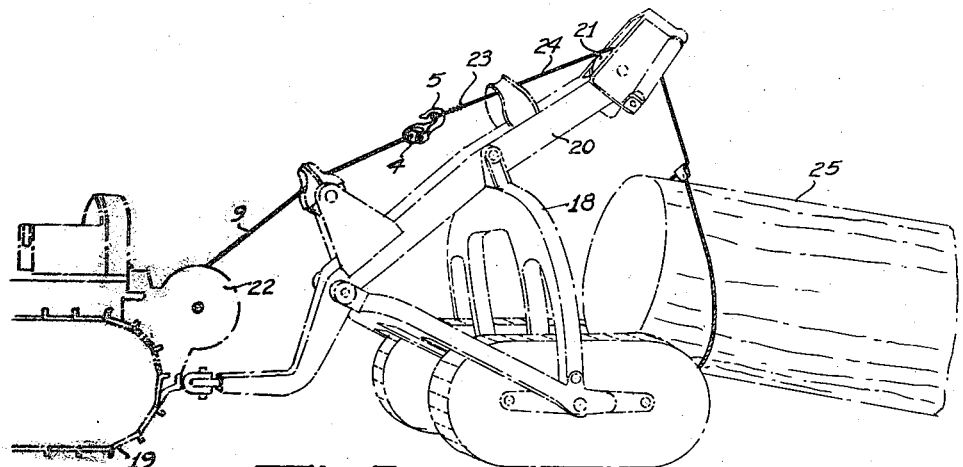
Figure 7 is a perspective view of an equipment, including a tractor and cruiser, for hauling logs from the woods to the loading or bucking landing, and illustrating a particular use for the hook and cable coupling herein descirbed.

Referring to the drawings, the invention is illustrated as embodied in a U-shaped member having laterally spaced arms 1—1, provided with aligned apertures 2—2 in which are journaled the trunnion pins 3—3 of a knuckle 4 freely rotatable about the axis of the trunnion pins. As shown in Figures 1 and 2, the U-shaped member may constitute therewith a hook 5, with the bight of the hook disposed in a plane perpendicular to the axis of the trunnion pins 3; or, as shown in Figure 6, the bight of the hook may lie in a plane parallel to the axis of trunnion pins 3.

The knuckle 4 is in the form of a hollowed hemisphere constituting therewithin a socket 7 for cooperatively receiving a ferrule 8 secured to the end of a cable 9 insertable into the socket 7 through a slot 10 in the wall of the knuckle. Preferably, the slot 10 is elongated in the direction of the axis of the trunnion pins 3—3 and describes an arc in the wall of the knuckle. As best seen in Figure 3, the slot 10 extends from a point adjacent the base of one of the trunnion pins 3 to a point adjacent the base of the other trunnion pin 3, thus permitting the standing part of the cable 9 to swing from side to side of the coupling device.

The ferrule 8 is provided with a transverse opening 11 for receiving the cable 9, the end of the cable being anchored in the enlarged end of the opening 11 by means of Babbitt metal or the like.

In practice, the free end of the cable 9 is inserted into the cup-shaped socket 7 in the knuckle 4 through the slot 10 and the ferrule 8 secured thereon. The ferrule 8 is in the form of a sphere and provides a ball and socket connection for swivelly connecting the cable 9 with the U-shaped member whereby the cable may be wound on a drum or unwound therefrom without twisting the hook. Tension may be applied to the cable 9 from any direction in the plane of the hook, and the hook will align itself with the line of tension on the cable without bending the cable at the point of connection with the coupling.

Figure 6 illustrates a coupling device comprising a U-shaped member having laterally spaced arms 12—12 in which are provided aligned bearings for the trunnion pins 13—13 of a knuckle 14 rotatably journaled in said bearings. As shown, the U-shaped member constitutes therewith a hook 15, the recurved portion being bent in a direction parallel to the axis of the trunnion pins 13. The hemispherical knuckle 14 forms therewithin a socket for cooperatively retaining a spherical ferrule 16 in ball and socket relation. A cable 17 extends into said socket through a suitable opening, conforming in all respects to the slot 10 shown in Figure 3, the cable end being secured by the ferrule 16.

The manner in which the logging industry makes use of devices embodying the invention is illustrated in Figure 7. The equipment shown includes an arched support 18, known as a cruiser, which is illustrated as towed by a tractor 19. Mounted on the arched support is a crane 20, at the upper end of which is a frame having a fair lead roll 21 journaled therein. Mounted on the tractor is a drum 22 having wound thereon an arch line cable 9, and fastened to the free end of the cable 9 is a ferrule 8 received within the socket 7 of an arch line coupling embodying the invention. As illustrated in Figure 7, the hook 5 engages the eye splice 23 of a choker line 24 which in turn supports the forward end of a log 25. The log is pulled into the position shown by winding the arch line cable 9 on the drum 22, and, when this has been done, the log is in position to be towed to the bucking or loading platform.

Figure 8:
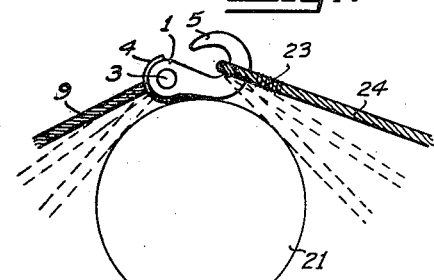
Figure 8 is an end view of the fair lead roll on the cruiser, and illustrates the flexibility of a unit embodying the present invention. In this view the hook is shown as going over the fair lead roll on its back with the bight of the hook in a vertical plane.
Figure 9:
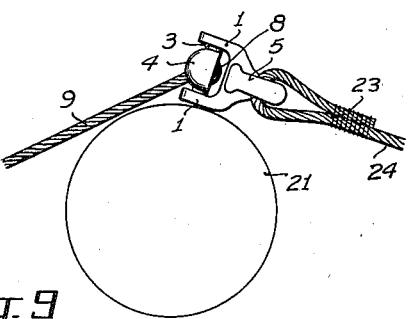
Figure 9 is similar in all respects to Figure 8, except that the hook and cable coupling is shown as going over the fair lead roll on its side with the knuckle trunnions in a vertical plane.

The enlarged diagrammatic views, Figures 8 and 9, illustrate an arch line coupling embodying the invention in typical positions which it will assume in passing over the fair lead roll 21. In Figure 7 the hook 5 is shown passing over the roll on its back, i. e., with the bight of the hook in a vertical plane. The dotted lines indicate the various directions in which tension may be applied to the cables without bending or kinking the arch line cable 9 at the point of connection with the hook. In Figure 9 the coupling is shown passing over the roll 21 on its side, and illustrates the manner in which the ball and socket connection arrangement permits the end of the cable 9 to shift relative to the hook 5 so that the pull will be in a straight line to the hook.

Figure 10:
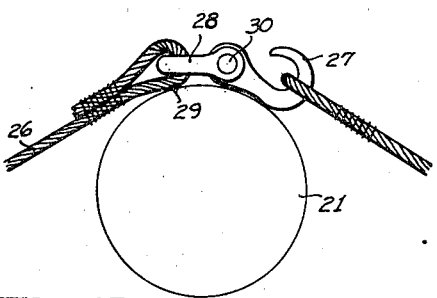
Figures 10 and 11 are views explanatory of the objects of the present invention.
Figure 11:
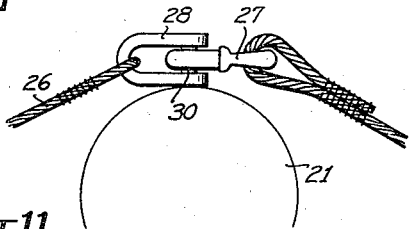

It will be observed that in passing over the fair lead roll no parts of the arch line cable 9 or coupling device are subjected to excessive wear, nor is any of such parts subjected to undue stresses. The cable and hook attached thereto pass smoothly over the roll 21 under straight line tension. Referring to Figures 10 and 11, it will readily be understood that if an arch line 26 were connected to a hook 27 by means of a simple clevis 28, the bends 29 of the looped end of the arch line cable 26 passing through the clevis 28 will be subjected to excessive wear in passing over the fair lead roll 21. On the other hand, if the twist of the cable should be such that the hook and clevis are caused to pass sidewise over the roll, in a manner such as is indicated in Figure 11, it will be apparent that both the hook 27 and clevis 28, and more particularly the clevis pin 30, will be subjected to exceedingly high stresses due to the angular direction of the applied tension forces. In actual experience it has been found that the life of an arch line cable with a clevis and hook arrangement is limited to a matter of from four to six days of normal use. In contrast with this, arch line cables provided with cable couplings in accordance with the present invention have been in use for a number of months without failure or even showing signs of excessive wear.

Figure 12:
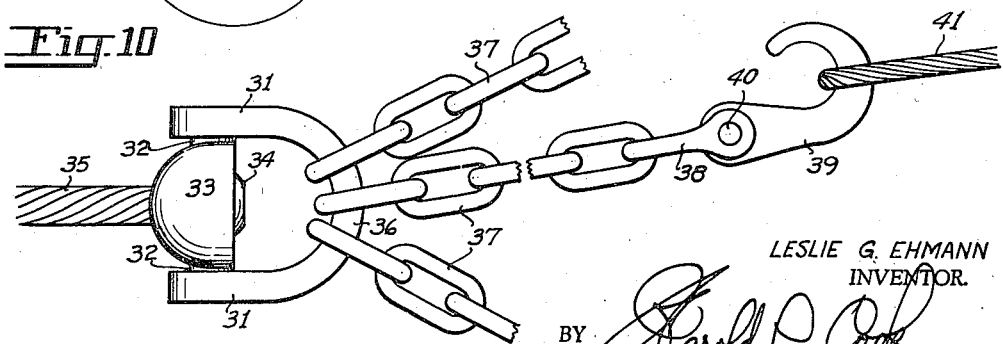
Figure 12 is a plan view of a cruiser rigging embodying a modification of the invention, the coupling device being shown as equipped with a plurality of tag chains.

Figure 12 illustrates a type of cruiser rigging embodying a modification of the invention. The construction shown comprises a U-shaped member having laterally spaced arms 31—31 in which are provided aligned bearings for the trunnion pins 32—32 of a knuckle 33 rotatably journaled in said bearings. The knuckle 33 is in all respects similar to the knuckle 4 shown in Figure 3, and forms therewithin a socket for cooperatively retaining the ferrule 34 secured on the cable end 35. As shown, the U-shaped member constitutes therewith a clevis 36, and mounted on the clevis 36 are a number of tag chains 37, three being shown by way of illustration. Each tag chain 37 comprises the chain links, a shackle 38, and a hook 39 mounted on the shackle pin 40. The chains are preferably of different lengths, so that the hooks 39 will follow each other over the fair lead roll without bunching. One, two or three choker lines, indicated at 41, can be hooked on each tag chain to make up maximum log loads.

Although particular reference has been made herein to the adaptability of the invention for use in logging operations, no limitation is intended thereby. It is entirely within the range of practicability to use an embodiment of the invention wherever cables are used for pulling or lifting heavy loads, as on hoists, cranes, derricks, and the like. For this reason, reference to any particular use to which the invention may be put is intended to be illustrative only, since the breadth of protection afforded hereby is limited only by the state of the prior art and the language of the appended claims.

Having now described my invention and in what manner the same may be used, what I claim as new and desire to protect by Letters Patent is:

1. A hook having a bifurcated shank providing a pair of laterally spaced ears, aligned apertures in said ears, a knuckle mounted between said ears and having trunnion pins rotatably journaled in said apertures, said knuckle comprising a socket having an elongated opening in the wall thereof for receiving a cable therethrough, said opening extending in the direction of said pins substantially uniformly on opposite sides of the longitudinal axis of said hook, a ferrule cooperatively retained in said socket, and a cable end securely fastened in said ferrule, the standing part of said cable extending through said opening.

2. A hook having a bifurcated shank, a knuckle rotatably mounted between the arms of said shank, the axis of rotation of said knuckle being in a plane perpendicular to the plane of the hook, said knuckle comprising a socket having an opening in the wall thereof for receiving a cable therethrough, said opening being elongated in a direction parallel to the axis of rotation of said knuckle, said opening extending substantially the same distance on opposite sides from the center of said socket wall.

3. A hook having a pair of spaced, parallel ears having aligned openings, a hemispherical knuckle mounted between said ears, trunnion pins extending from opposite sides of said knuckle and journalled in said openings whereby said knuckle is pivoted for rotation about the axis of said openings, a slot in the wall of said knuckle, said slot extending from a point adjacent the base of one of said trunnion pins to a point adjacent the base of the other of said trunnion pins in a direction parallel to the axis of rotation of said knuckle.

4. A hook having bifurcations provided with bearings, a socket mounted between said bifurcations and having radial trunnions journaled in said bearings, an elongated opening through said socket, extending on opposite sides from the center of said socket in the direction of said trunnions a spherical ferrule cooperatively retained in said socket, a cable end securely fastened in said ferrule, the standing part of said cable extending through said opening.

5. A hook having bifurcations, a socket rotatably journaled in said bifurcations, a slot providing an opening through said socket, the long axis of said slot being parallel with the axis of rotation of said socket, and a ferrule in said socket for retaining a cable end therewith, the curvature of the hook being such that the line of tension on the hook will pass through the axis of rotation of said socket at right angles thereto, the ferrule being movable within said socket for holding the rope end in alignment with the line of tension on the standing part.

6. A hook, means forming a socket secured to the shank of said hook, an elongated opening in a wall of said socket forming means opposite said hook, said opening extending substantially uniformly in opposite directions from the center of said socket wall, a draft cable having an end extending through said opening and a ball secured about the end of said cable and cooperatively retained in said socket.

7. A hook, means forming a socket secured to the shank of said hook for rotation about an axis perpendicular to the plane of said hook, an opening in the wall of said socket forming means opposite said hook, said opening being elongated in the direction of said axis, a spherical ferrule cooperatively retained in said socket forming means and adapted to be secured about the end of a draft cable extending through said opening.

8. A device for swivelly attaching a load to a draft cable, comprising a U-shaped member having laterally spaced arms, a knuckle journaled in said arms, said knuckle constituting therewithin a hemispherical socket, a spherical ferrule cooperatively retained in said socket in ball and socket relation, an opening through said socket, said opening being elongated in the direction of the axis of rotation of said knuckle, and a cable having an end extending through said opening and secured by said ferrule.

9. A device for swivelly attaching a load to a draft cable, comprising a U-shaped member having laterally spaced arms and a recurved portion forming a hook, means forming a hemispherical socket mounted between said arms and having radial trunnions journaled therein, a spherical ferrule cooperatively retained in said socket in ball and socket relation, an opening in the wall of said socket opposite said hook, said opening being elongated in the direction of the axis of said trunions, and a cable having an end extending through said opening and secured by said ferrule.

LESLIE G. EHMANN.